United States Patent

[11] 3,591,722

[72] Inventor Helmut Palsa
near Dachau, Germany
[21] Appl. No. 801,427
[22] Filed Feb. 24, 1969
[45] Patented July 6, 1971
[73] Assignee Siemens Aktiengesellschaft
Berlin, Germany
[32] Priority Feb. 26, 1968
[33] Austria
[31] 1834/68

[54] CIRCUIT ARRANGEMENT FOR DATA PROCESSING TELEPHONE EXCHANGE INSTALLATIONS WITH SYSTEMS FOR MESSAGE TRANSMISSION
3 Claims, 5 Drawing Figs.

Figure 1A:
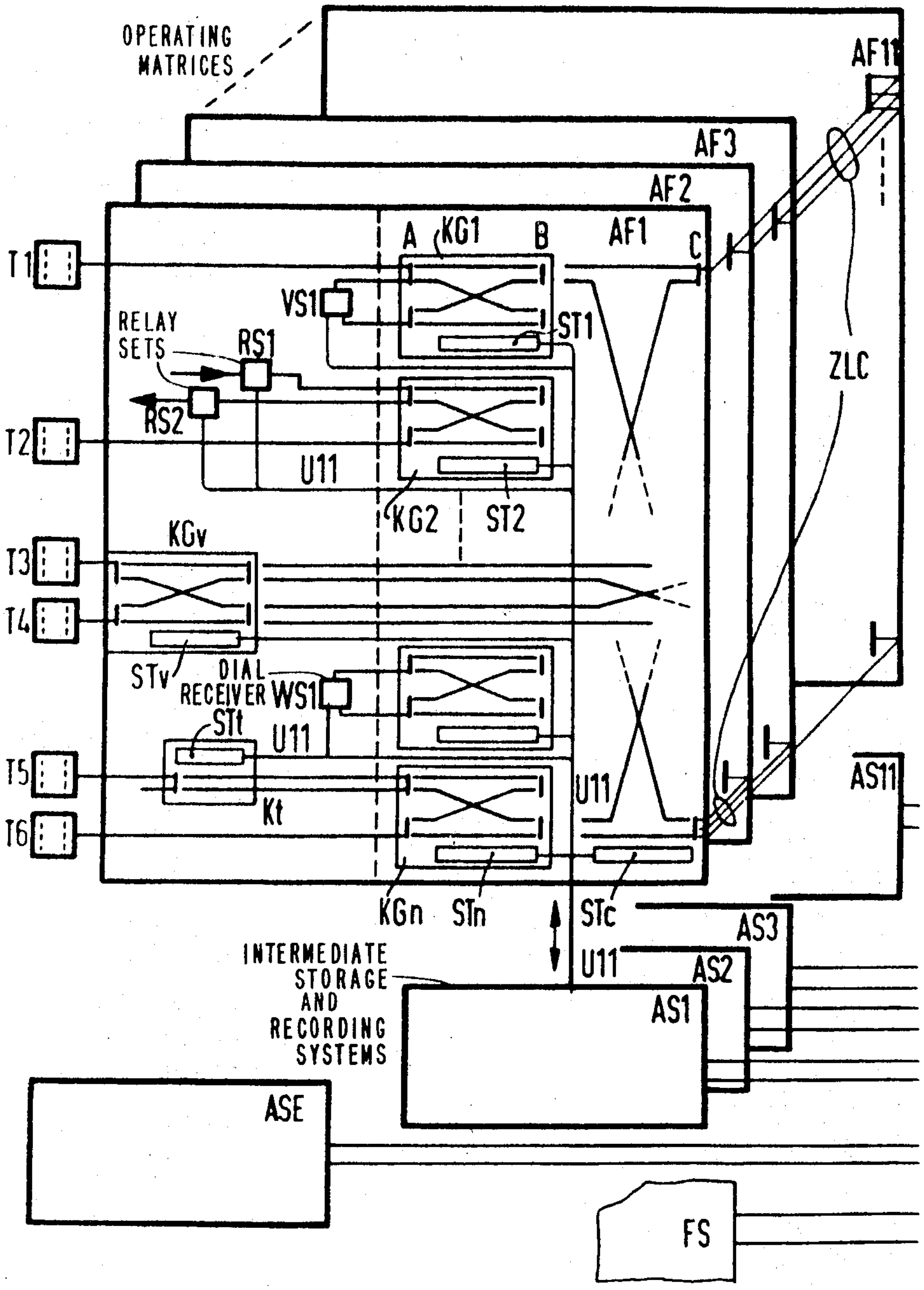

[52] U.S. Cl. .......... 179/2, 340/172.5
[51] Int. Cl. .......... H04m 11/06
[50] Field of Search .......... 340/172.5, 167, 168; 178/4.1, 53.1, 53; 179/2 DP, 2 R, 2

[56] References Cited
UNITED STATES PATENTS 3,408,626 10/1968 Gabrielson .......... 340/163
3,141,151 7/1964 Gilson .......... 340/172.5

*Primary Examiner*—Kathleen H. Claffy
*Assistant Examiner*—Tom D'Amico
*Attorney*—Birch, Swindler, McKie & Beckett ABSTRACT: A circuit arrangement for telephone exchange installations wherein messages of different length are divided according to their length into a number of corresponding code signals of constant information volume for transmission in series over the same transmission path and consist of equally large groups of code elements, and wherein, prior to the code signals of a message, a length indicating signal indicative of the length of the message is transmitted to indicate the number of code signals corresponding to the message. First counter means presettable to an initial position by the length indicating signal and controllable to switch forward in pulse manner to a first predetermined position are used in conjunction with second counter means synchronously dependent on the switching forward of the first counter means and responsive thereto to be switched forward out of a second predetermined position. The second counter means have control outputs assigned to its counting positions that control the transmission and reception of code signals transmitted in series over the same transmission path from and to circuits individually assigned thereto. A comparator is responsive to the first counter means when the latter attains the first predetermined position to test the position of the second counter means and the received length indicating signal with regard to agreement.

CIRCUIT ARRANGEMENT FOR DATA PROCESSING TELEPHONE EXCHANGE INSTALLATIONS WITH SYSTEMS FOR MESSAGE TRANSMISSION

CROSS-REFERENCE TO RELATED APPLICATION

Applicant claims priority from corresponding Austrian application Ser. No. 1834/68, filed Feb. 26, 1968,

BACKGROUND OF THE INVENTION

1. Field of the Invention

The invention relates to a long distance switching arrangement wherein information is transmitted in different coded forms over first and second types of transmission lines. It has particular utility in the telephone communication art for transmission of information between central and individual apparatus.

2. Description of the Prior Art

In copending U.S. application, Ser. No. 768,749, assigned to the same assignee as this application, a circuit arrangement for data processing installations, in particular telephone exchange installations, wherein messages of different lengths are subdivided into a number of code signals corresponding to the length of the message in question of constant information volume is described. These are transmitted in series and consist of equally large groups of code elements. Prior to the code signals of a message, a length information indicating the length of the message is transmitted which signals the number of code signals corresponding to the message.

The said code signals of a message are transmitted in series over the same transmission path. However, at the transmitting station they do not originate as a rule at the same source and, at the receiving station they are not destined to be forwarded to one single place. Code signals of a message correspond, for example, to the digits of a multidigit number. If they are transmitted in succession, then, at their emission they must be called in succession by the different sources corresponding to the digital places of the number; for example, by storage places assigned to the digital places. The same is true for the reception whereby the code signals must be directed toward different places, for example, storage places.

Of the code signals of such a message, a portion can also contain the address by which one of many transmitters or receivers of the message is indicated, from which or for which the information contained in the further code signals of the same message originates or is intended. For this reason a distributor is required at the transmission and receiver locations which is switched forward in the rhythm of the transmitted code signals and controls the calling or the emission of the code signals pertaining to a message in the succession they are to be transmitted or received. As the number of code signals pertaining to a message can vary, this distributor must also be in a position to count off the introductorily mentioned length indication in order to carry out the calling or the emission according to the message length in question.

For such a counting process, reverse counters or complementary counters are especially suited; these are counting devices that are switched forward from any starting position to which they are preset (for example, through the length data) to a specified place (for example, zero position or end position) and are stopped there due to the arriving at this position. However, these counters are less suitable for the controlling of the calling off or the emission of the transmitted code signals, as their counting process does not originate at any specified starting position, and as a consequence, when counting off different length indications, the same number of counting steps does not lead necessarily to the same control commands for the calling or the emission of the code signals to be transmitted or received.

However, this controlling can easily be carried out with forward counters which always begin their counting process from the same position, for example the zero position. However they are not suited for the counting off of different length indications, as the stopping thereof is determined by the latter and is thus variable and must be newly marked in each operational case.

SUMMARY OF THE INVENTION

There thus exists the task for the invention to synchronize the above- mentioned oppositely directed operating conditions with one another by a switching arrangement which represents an optimum solution with regard to the mentioned operating conditions, as well as simplicity, clarity and operational reliability. This task is solved according to the invention through the fact that a first counting device is preset by the length indication and is switched forward in pulse manner into a specified position; for example, end position. Synchronously with and in switching dependence on the forward switching of the first counting device, a second counting device is switched forward out of a specified position (for example, zero position) and controls, over output assigned to its counting positions, the emission and/or receiving of the code signals transmitted in series over the same transmission path from and/or to circuits individually assigned thereto. The first counting device causes after reaching its specified position, a comparator to test the position of the second counting device and the received length indication as to whether they are in agreement.

Through the use of a forward counter as well as a reverse counter, an arrangement is developed which combines the necessary operating conditions, circumventing unsatisfactory compromise solutions, and which in addition offers high operational reliability. A received length indication causes two counting processes, of which a first one controls a second one, and supplies, in addition to the control criteria for the said call or the said emission of transmitted code signals as end result of the second counting process, the length indication again which is comparatively tested with the received length indication regarding agreement. Thus, in simple manner, the functional efficiency of the circuit arrangement according to the invention is tested in each operational process. A disturbance occuring in the circuit is recognized immediately. This strict supervision is of essential importance for a telephone exchange installation according to the other identified application, as thereby the parallel course between the transmitter and receiver in each case brought about by the length indication can be more reliably guaranteed.

BRIEF DESCRIPTION OF THE INVENTION

Figure 1B:
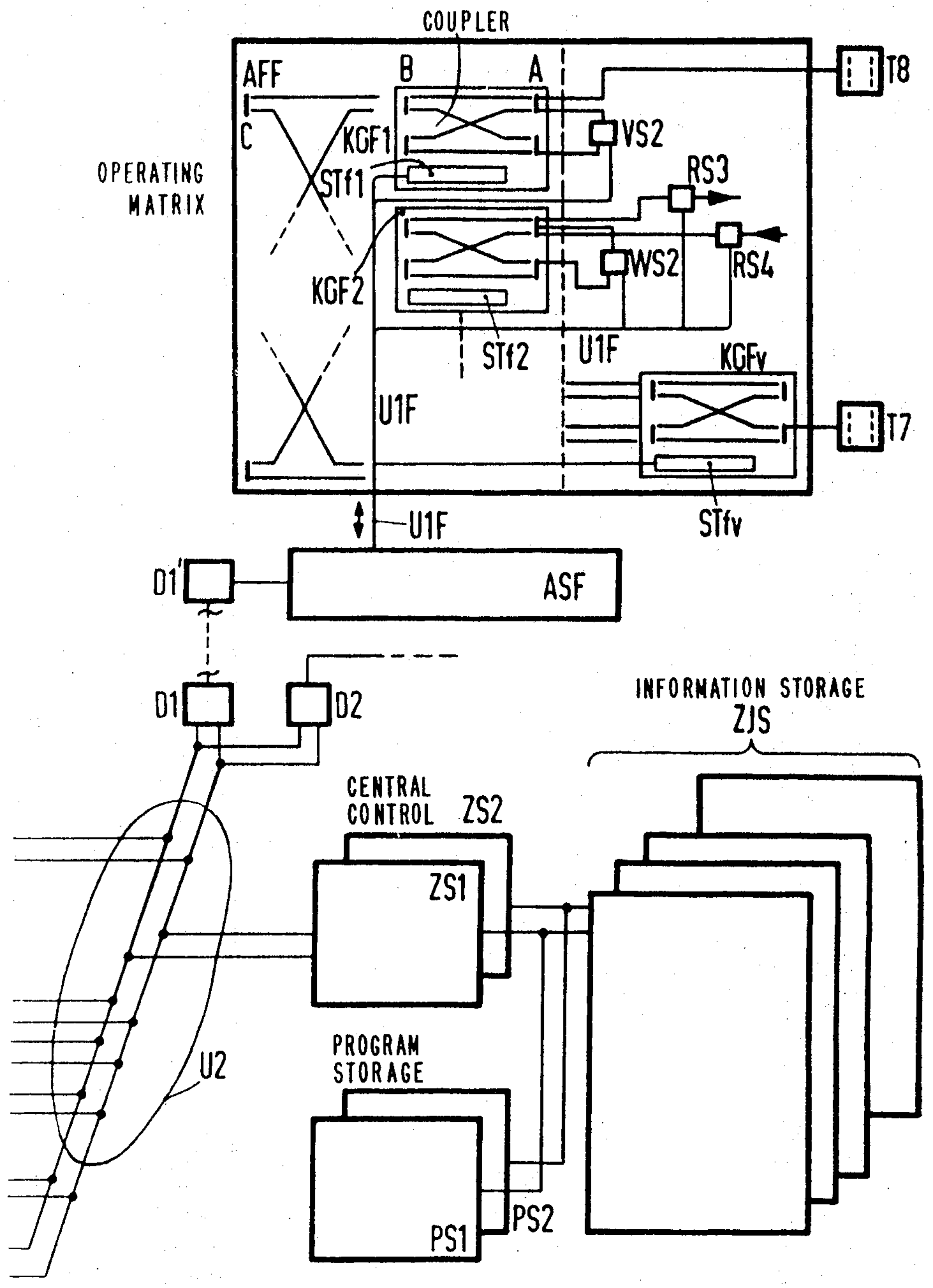
Figure 2:
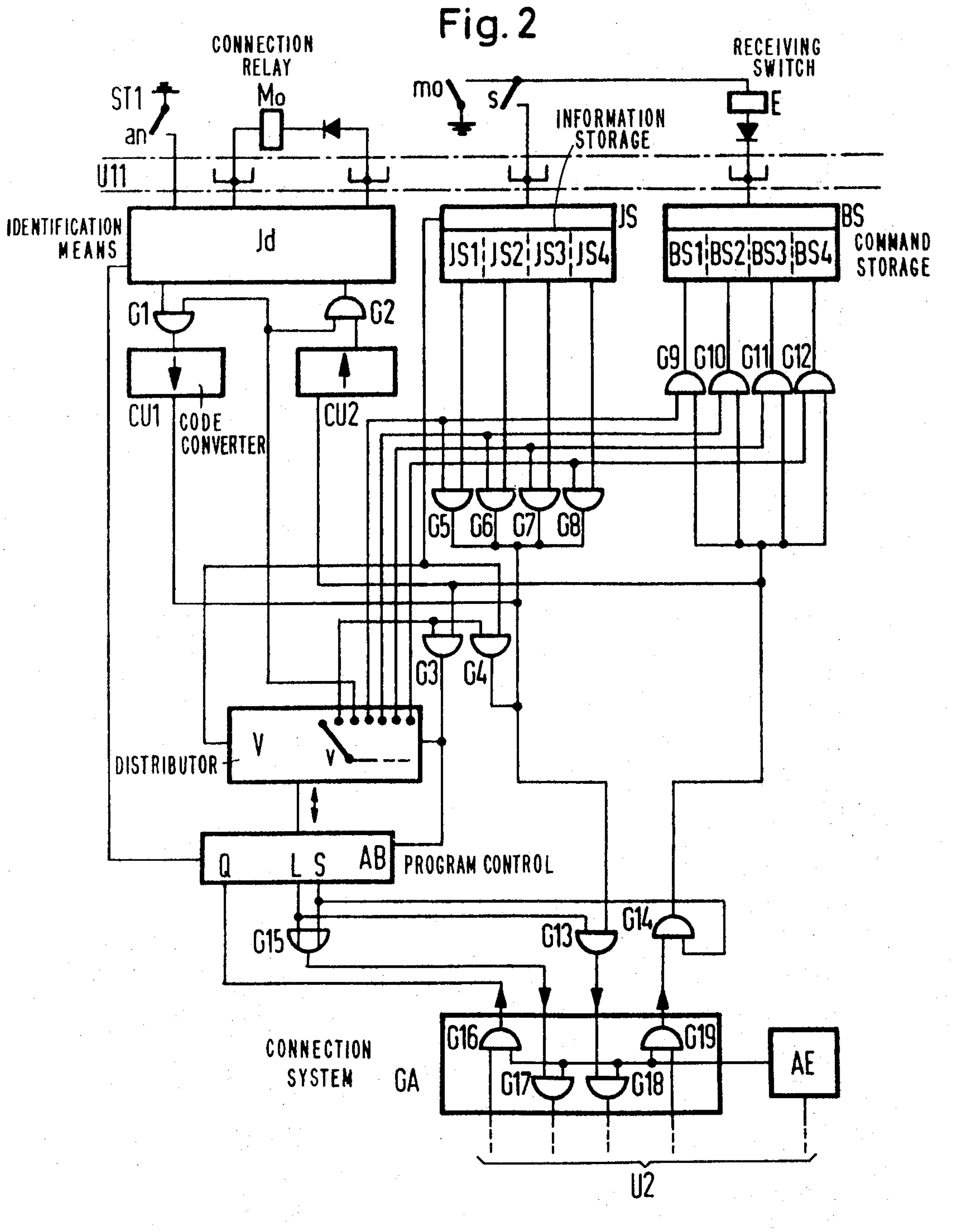
Figure 3A:
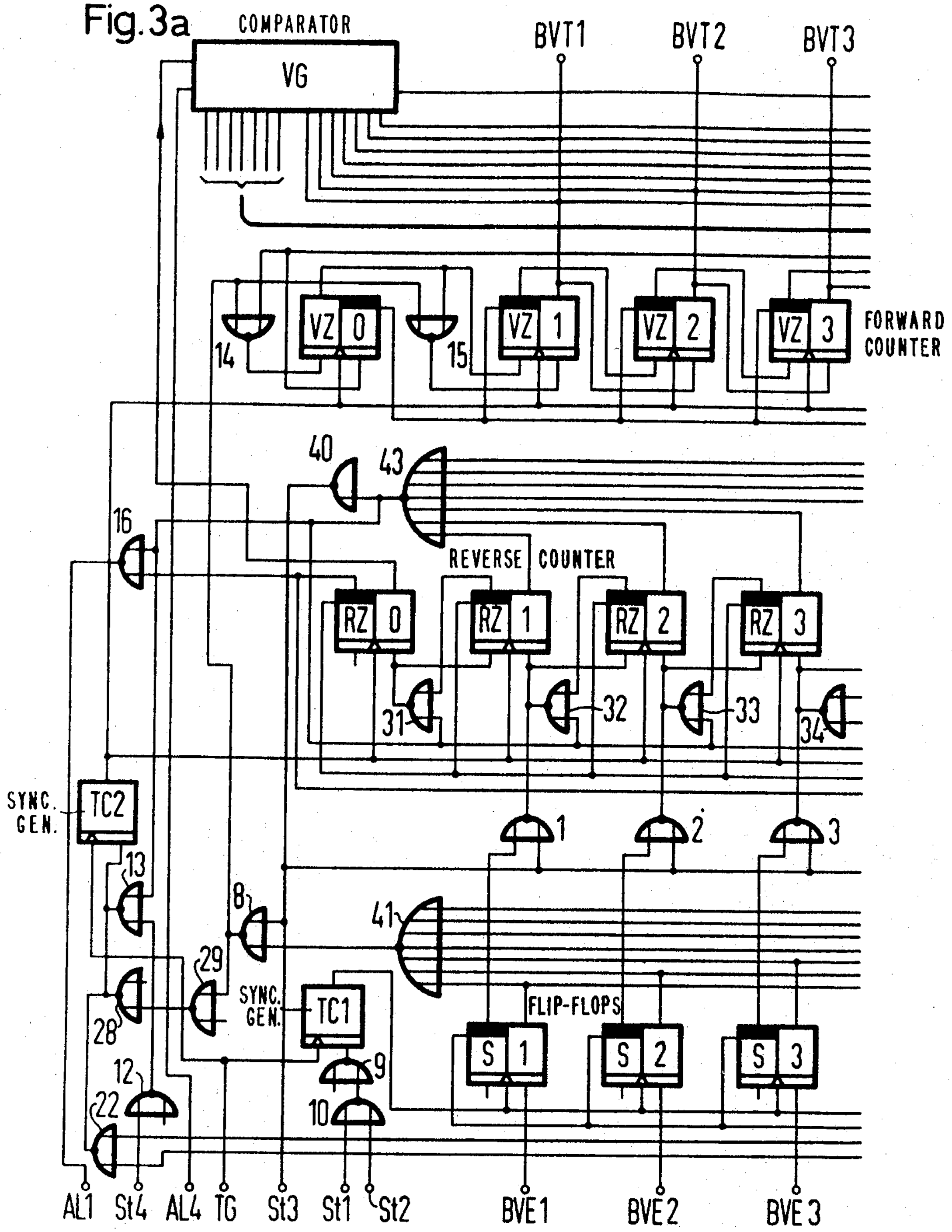
Figure 3B:
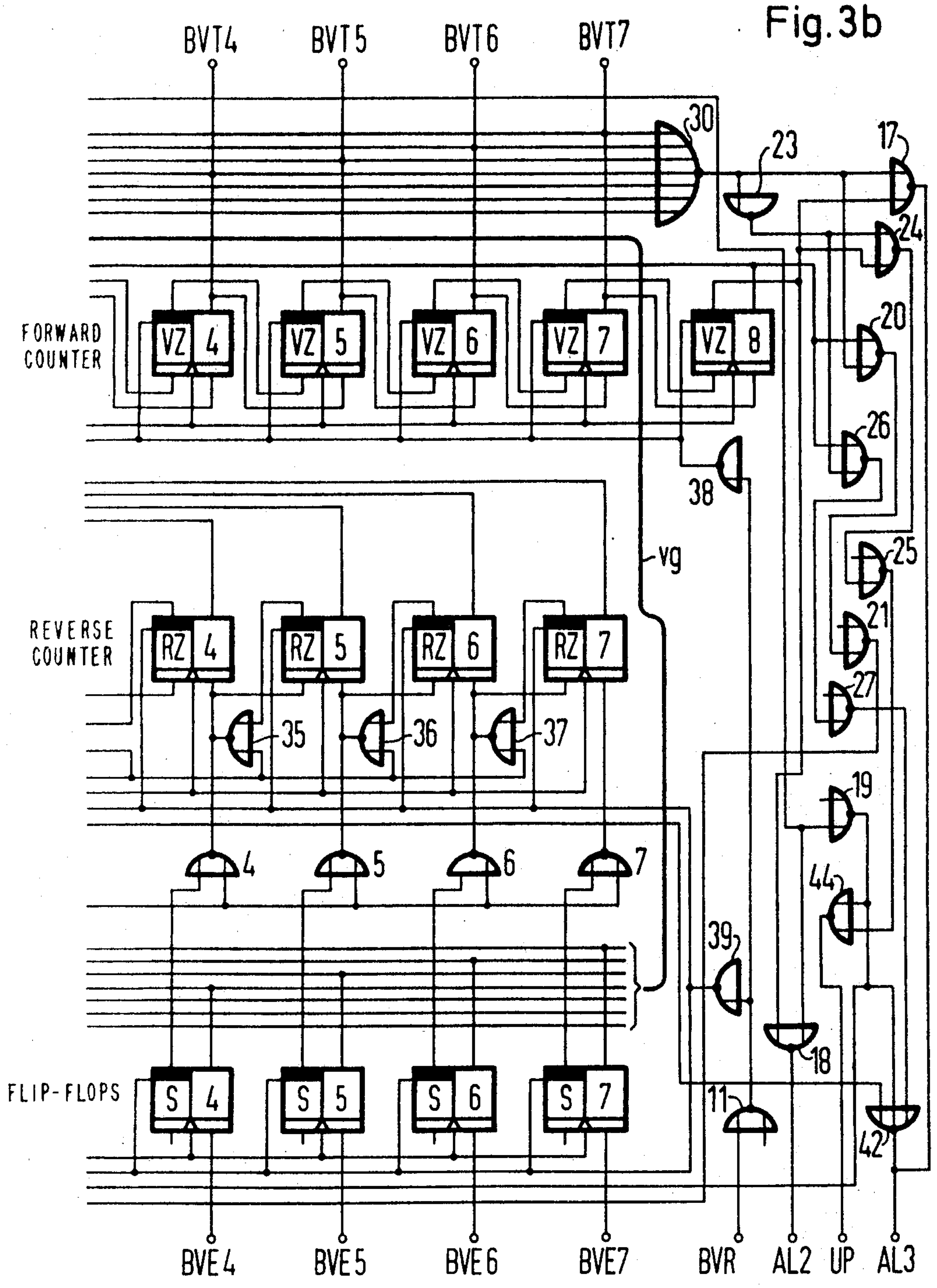

FIGS. 1*a* and 1*b* show a telephone exchange installation;

FIG. 2 shows an essential part of the installation of FIG. 1 in greater detail;

FIGS. 3*a* and 3*b* show the distributor of FIG. 2 in greater detail.

DESCRIPTION OF THE INVENTION

FIG. 1 shows a telephone exchange installation according to the invention having a plurality of groups of operating matrixes AF1...AF11, and AFF. Intermediate storage and recording systems AS1...AS11 comprise operating matrix control means for operating matrixes AF1...AF11, respectively. The operating matrix control means AS1...AS11 of the exchange installation are connected by transmission lines U2 of the second type with first and second central control means ZS1 and ZS2, respectively. The arrangement of the two central control means serves, in known manner, to increase the operational reliability of the entire exchange installation with regard to the possibility of a misfunction or an interruption of the operation of a central control means. It also functions to supervise errors by comparing two informations supplied independently of one another by the two different central control means. As this is not essential for understanding the invention, a single central control means is usually discussed hereafter.

The operating matrixes each comprise, inter alia, coupling stages A and B of the three-stage switching matrix having coupling groups consisting of individual coordinate couplers, for example KG1 to KG*n* in the instance of operating matrix AF1 and KGF1, KGF2..., in the instance of distant operating matrix AFF. To each coupling group an individual control means, for example ST1 in the instance of coupling group KG1, is assigned, which carries out the setting orders received from the operating matrix control means. In each case one coupling group and its assigned individual control means constitutes an individual apparatus. Further, the entirety of the couplers of coupling stage C with its control means ST*c* are individual apparatus.

It is also possible to combine these couplers in an operating matrix in several individual apparatus having individual control means. Further, connection sets, for example VS1 for connections to be switched-through within the exchange installation consisting of operating matrixes AF1 to AF11, are individual apparatus. Relay sets, for example RS1 and RS2, are individually assigned by connection lines (local and long distance lines) to exchange installations at other locations for arriving and/or departing connections. The individual apparatus also includes dial receivers, for example WS1, which serve subscribers for reception of dial information signals; preferred coupling groups, for example KG*v* having individual control means ST*v*; and preferred one-stage couplers, for example K*t*, having individual control means ST*t*. These preferred coupling groups and one-stage couplers are of an importance which corresponds to the larger and smaller dial star switches known in customary exchange installations. Moreover, not shown subscriber-individual subscriber connection circuits can be arranged as individual apparatus or in groups.

All of these individual apparatuses of an operating matrix for example AF1 are connected, over a network of transmission lines of the first type, for example U11, with the operating matrix control means in question, for example AS1. Each individual apparatus contains connection devices which are controllable by the operating matrix control means. For this, if the requirement for a connection exists in the individual apparatus, a connection impulse is given therefrom to the identified operating matrix control means which leads to the transmission of an order to effect connection to the individual apparatus in question.

The operating matrixes, for example AF1, thus possess three coupling stages each, the couplers whereof are connected over intermediate lines in such a way that to one coupler output each in the first to the next to the last coupling stage A and B, one coupler input each in the second to the last coupling stage B and C is individually fixedly assigned. The outputs of the couplers of coupling stage C in all operating matrixes AF1 to AF11 and AFF are at least partially disconnected. In operating matrixes AF1 to AF11 a part of these outputs is individually connected in pairs over intermediate lines ZLC leading from one operating matrix to another.

To the two central control means ZS1 and ZS2 arranged next to each other there are respectively assigned program storage means PS1 and PS2. The central control means read from the program storage means according to which program comprising information transmitted by an operating matrix control means to be processed is received in the central control means. In addition, a common multipart information storage means ZJS is assigned to the two central control means, the entire storage capacity whereof is available to the two central control means according to the needs in each case.

FIG. 2 gives further details of an operating matrix control means (AS1) shown in FIG. 1. The operating matrix control means is in connection, over transmission lines of the first type, for example U11, with individual apparatus, for example control system ST1 of coupling group KG1, and over transmission lines of the second type (U2) with the central control means shown in FIG. 1. The operating matrix control means can be requested by individual members, for example coupling group control ST1. With the aid of identification device I*d*, the operating matrix control means is in a position to select one from several simultaneously present connection impulses, which are actuated over request contacts such as an, and transmit a corresponding order to connect to the connection relay M*o* which corresponds to the connection impulse in question.

The request circuits are connected individually to the operating matrix control means from each individual apparatus. The connection relays such as M*o* of the individual apparatus are located in a control matrix extending over all individual apparatus.

With the aid of contact *mo* of connection relay M*o*, transmission switching device *s* and receiving switching device E of switching matrix control means ST1 are switched effective.

Preparatory to the description of the mode of operation of the operating matrix control means some definitions of terms will be given. As already evident from the above explanation, information is transmitted from the individual apparatus to the central control means, as well as from the central control means to the individual apparatus. In any case, the operating matrix control means serves as an intermediate member. Information transmission from one individual member to the central control means is subsequently always designated as "-writing." The reverse information transmission from the central control means to an individual apparatus is always designated as "writing." Accordingly, the criteria "reading" and "writing" are formed in the operating matrix control means.

The criterion "reading" is always formed in the operating matrix control means if a request by an individual member, for example coupling group control means ST1, is present over request contact and if all switching processes of preceding functional programs are terminated. However, if no such request by an individual member is present, the criterion "-writing" is formed in the operating matrix control means which expresses the readiness of the operating matrix control means to receive information which may be present in the central control means and is to be transmitted to the said operating matrix control means.

Moreover, it can also be the case that neither a request by an individual member is present nor that the operating matrix control means is ready to receive information. This operational state exists in the case when an operating matrix control means has not yet completed processing certain information. The operating matrix control means is thus not ready for any kind of information exchange with the central control means. The criterion "block" is then formed in the operating matrix control means.

A common transmission line U2 is connected from central control means ZS1 to all operating matrix control means. It scans cyclically and in succession, all operating matrix control means to determine in each case whether the criterion "reading," "writing" or "block" is present. For this purpose each operating matrix control means has a connection system GA. An address receiver A*e* is assigned to this connection system GA. In order that, during scanning of the operating matrix control means by the central control means, always only one single operating matrix control means is connected, each connection is caused through the transmission of the address corresponding to the operating matrix control means in question from the central control means. (Under no circumstances should this address be confused with the addresses of the individual apparatus described in detail later.)

This address transmission from the central control means to an operating matrix control means for temporary connection of the latter to transmission line U2 can be carried out in different ways. It is possible to assign a separate address line to transmission line U2. The central control means transmits, for the duration required for connection, the address of the operating matrix control means in question. The beginning and end of the connection is determined in simple manner through the beginning and end of the address transmission over the address line.

If the connection or disconnection of an operating matrix control means to or from transmission line U2 is caused by the central control means, only the address receiver of the operating matrix control means in question reacts and opens or closes the coincidence gates, G16, G17, G18 and G19, of connection system GA.

The criteria "reading," "writing" and "block" are formed in program control AB of the operating matrix control means. The criterion "reading" is transmitted over output L of program control AB, and the criterion "writing" over output S of the program control. The criterion "block" resides in the fact that the criteria "reading" and "writing" are transmitted at the same time.

The criteria "reading," "writing" and "block" are offered to the central control means. When the central control means causes over connection system GA the connection of an operating matrix control means to transmission line U2, it always receives one of these three criteria. For the transmission of these criteria, special criteria lines can be assigned to transmission line U2. However it is also possible to offer these criteria to the central control means over transmission line U2.

If in an operating matrix control means the criterion "-writing" is present, there is thus transmitted a corresponding criterion to the central control means as soon as the latter causes in already described manner the connection of the operating matrix control means over the connection system GA thereof. If the central control means has stored in its information storage means information to be transmitted to the operating matrix control means in question, it then carries out the transmission of such information to the said operating matrix control means in a manner described in more detail hereafter. However if no such information is present, the central control means causes again in the manner described disconnection of the operating matrix control means from transmission line U2 by its connection system GA.

However if in an operating matrix control means the criterion "block" is present when the central control means causes the connection of this operating matrix control means, the central control means causes in the manner described the disconnection of the operating matrix control means in question, independently from the fact as to whether or not information to be transmitted from the central control means to the operating matrix control means is present.

However, if the criterion "reading" is present in an operating matrix control means, it is also transmitted over gates G15 and G17 upon connection of the operating matrix control means to the central control means. Thereupon the central control means returns a criterion to the operating matrix control means which initiates transmission of the information in question from the operating matrix control means over transmission line U2 to the central control means. The information is transmitted in several segments. Each information segment is separately initiated and acknowledged by special criteria. This and the transmission of information in segments will be explained hereafter in more detail.

The transmission of information on transmission lines U1 of the first type is carried out according to a parallel coded method. All partial informations are transmitted simultaneously over the multiconductor transmission line U11 to the operating field control means.

All subscriber information is transmitted simultaneously over the multiconductor transmission line U11 to the operating matrix control means. Information storage means JS comprises a separate part for each of four information segments: JS1, JS2, JS3 and JS4. Further, command storage means BS provides a separate part for each of the four information segments: BS1, BS2, BS3 and BS4. The different designation of information storage means JS and command storage means BS also indicates that in one case the central control means has "readable" information, and in the other case "writable" commands. These definitions are retained in subsequent portions of the specification.

For transmission on transmission line U2, each information transmission consisting of several information segments, and each command consisting of several command segments is supplemented by a length specification and an address. (These are the addresses of individual apparatus; they should not be confused with the addresses of the operating matrix control means.)

Prior to an information or command transmission, the length data are first transmitted. It indicates the quantitative extent of the subsequently transmitted information or of the command. If the total contents thereof can be expressed by less than four information or command segments, the information or command transmission is limited to fewer information or command segments. Due to prior receipt of prior length data, the receiver in each case, i.e., the operating matrix control means or the central control means knows when the information or command transmission will be completed.

Further an address indication precedes each such transmission. Thus it is always specified beforehand from which individual apparatus an information emanates or for which individual apparatus a command is intended.

It has already been explained that information transmitted is divided into several information segments, with the largest number of such segments being limited to four. The address data immediately preceding the information segments on transmission line U2 may additionally comprise segments, the largest number thereof being limited to two. The length data preceding the address data maximally comprises one segment in the present working example.

The length data, the address data and the maximum of four information or command segments are temporarily stored in equally large groups of binary code elements in the operating matrix control means and recoded and transmitted therefrom or thereto; this recoding can be limited to a conversion parallel/series code or vice versa, and can, together with the intermediate storage form a single common process. The mentioned group of binary code elements is designated a byte. A first byte containing the data concerning length, a second and a third byte concerning the address data, and according to the present working example a maximum of four further bytes containing information or commands in each case jointly form a "word." The transmission of a word over transmission line U2 is controlled with the aid of auxiliary criteria. These auxiliary criteria are "reading" (L), "writing" (S), "block" (L+S), as already described, and "acknowledged" (Q). It has already been indicated in what manner information to be read by the central control means is transmitted from an individual member, for example switching matrix control means ST1 to the operating matrix control means in FIG. 2.

The information is divided, corresponding to storing in partial storage means JS1 to JS4 of the information storage means, into several bytes. Together with the information there is also present the quantitative extent thereof in information storage means JS. The length data is offered to one of the two inputs of gate G4. The individual bytes stored in information storage means JS are offered to one input each of gates G5, G6, G7 and G8. Gates G4 to G8 symbolically express here that the information placed at one of their inputs, mentioned in each case, can only be conveyed on when a corresponding signal is placed, in each case over the other input of the gate, for transmission. This signal is connected by distributor V, with the aid of its switching arm *V*, successively to the different gates G1 to G12, so that successively the individual bytes can be transmitted; i.e., first the data as to length, then the address and then the information or the command.

The distributor is a working example of the introductorily mentioned invention. The informations essential for its functioning are the length indication and further control criteria transmitted to it by program control means AB. It is described in more detail in the following with reference to FIG. 3.

Thus, in rest position, the criterion "writing" (*s*) is applied to the central control means over gates G15 and G17 by program control means AB. As has already been explained, for the central control means this indicates that the operating field control means is ready to receive a command from the central control means.

If, however, the operating field control means was requested by one of the individual apparatuses, then, as soon as the length indication, the address and the information are stored and are ready to be transmitted in the operating field control means, corresponding criteria are transmitted to the program control means AB which cause this to start distributor V with the aid of an appropriate criterion (St1 in FIG. 3). Due to this criterion, distributor V receives the length indication offered by information store JS. This process is acknowledged for program control means AB by distributor V (over circuit St3 in FIG. 3). The latter transmits a further criterion to distributor V which causes the latter to actuate its switching arm *v* from its designated zero position forward by one step. Thereby gate G4 becomes enabled to pass the length indication.

This fact is recognized by program control means AB in a manner not shown, which thereafter offers, over gates G15 and G17, the criterion "reading" to the central control means. If this, in its connection cycle, causes the connection system GA of the operating field control means in question to connect this to transmission line U2, then the central control means receives at first the criterion "reading" (L). To the central control means this indicates that it is to take over an information from the just connected operating field control means. As soon as the central control means is ready to receive, through connection to a free storage row in the central information store Z, it receives the length indication which is already offered by the operating field control mechanism on transmission line U2 of the second type.

The central control means receives the length data transmitted from the operating matrix control means over transmission line U2. As soon as it has received it, it transmits the criterion "acknowledged" (Q) over transmission line U2 or over a separate criterion line to the operating matrix control means. This criterion arrives in program control AB (Q). Thereupon program control AB transmits, in the already described manner, the criterion "block" to the central control means.

Thereupon the program control AB transmits a switch-forward pulse to distributor V. This switches the distributor switching arm *v* forward by one step. Thereby gate G4 is blocked for transmission of the length data, and gate G1 is enabled or opened for transmission of the address from identification means JD to code converter CU1. As soon as this switching forward is completed, the program control AB disconnects the criterion "block" and connects criterion "reading." This causes the central control means to received the address data conveyed over gates G1, G13 and G18 unto transmission line U2. As soon as this has taken place, the central control means transmits over the transmission line U2 an acknowledgement through open gate G16 to program control AB. The central control means has received the address. As has already been explained, the address can be transmitted in the form of one or two bytes.

The information segments are transmitted in the same manner after the address in the form of further bytes from the operating matrix control means towards the central control means. The length data was stored previously in distributor V. Therefore the regular end of information transmission can be determined in the operating matrix control means. As the length data was transmitted to the central control means, the same is also true for the central control means.

After receipt of the last information segment of a word, the central control means returns for the last time the criterion "acknowledged"program control of the operating matrix control means. As due to the transmission of the length data in the beginning, the quantitative extent of the information to be transmitted was stored in the operating matrix control means as well as in the central control means, it is possible in simple manner to supervise the proper course of information transmission. If after transmission of one of the information segments no acknowledgement signal is transmitted from the central control means to the operating matrix control means, the latter sounds an alarm in a manner not shown after a predetermined time period has elapsed. An alarm is also sounded if the central control means, instead of the expected criterion "reading," receives the criterion "writing" or "block" without having already received the number of information segments which was indicated by the length data. In one of the two preceding cases the central control means requested not enough information, and in the other case not enough information was offered to the central control means.

Commands are transmitted from the central control means to operating matrix control means in the same manner as information. It has already been outlined that an operating matrix control means which is ready to receive commands keeps available the criterion "writing" at gate G17 over gate G15. As soon as the central control means causes, in the manner already described over connection system GA, the operating matrix control means to connect to transmission line U2, it receives the criterion "writing" (S). It is assumed that it has stored a command destined for the operating matrix control means. The central control means now transmits over gate G16 the acknowledgement signal (Q) to program control AB of the operating matrix control means. The program control AB as a consequence causes in a manner not shown over distributor V gate G3 to be switched open to pass the first byte expected from the central control means over gates G19 and G14. This first byte again contains the length data which is received by distributor V and stored. It thereby knows after how many switchings forward of its switching arm *v* the command transmission is concluded.

As soon as the program control AB has received the criterion "acknowledged," it disconnects the criterion "writing." First the operating matrix control means processes the length data, thereupon it conveys a switch-forward pulse to distributor V which as a consequence thereof switches its switching arm *v* forward by one step. Thereupon the program control AB again connects the criterion "writing." The last mentioned criterion causes the central control means to now transmit the address of that individual apparatus for which the subsequent information is intended, instead of the length data, over the transmission line U2 to the operating matrix control means. In addition, the central control means transmits the criterion "acknowledged" to program control AB of the operating matrix control means whereupon this, in a manner now shown, causes over distributor V gate G2 to be switched open to pass the second byte expected from the central control means over gates G19 and G14. This byte which contains the address of that individual apparatus for which the subsequent information is intended or a portion thereof is received over code converter CU2 and transmitted over gate G2 to identification means Id. It is thereby converted by code converter CU2. Identification means Jd causes over the coordinate control matrix the connection of the connection relay, for example Mo, of that individual apparatus (ST1) designated by the address.

There are now successively received in the same manner, with the aid of the criteria "writing" and "acknowledgment" the bytes containing the command to be transmitted. These are passed over gates G9 to G12 and received in partial storage means BS1, BS2, BS3 and BS4 of command storage means BS, and stored therein temporarily. Thereafter the central control means causes in the already described manner the operating matrix control means in question to again be disconnected by connection system GA from transmission line U2.

Now that in the above explanation a complete description of the functions of a telephone exchange installation have been given, wherein the inclusion of a circuit arrangement according to the invention provides special advantages, the latter is described in the following in more detail. Distributor V receives the length indication prior to the transmission of an information or command and controls, through counting off of the length indication through criteria received from program control means AB, the transmission as well as the receipt of the bytes to be transmitted in series over the same transmission path U2. These bytes are groups of binary coded elements. The coded elements of a byte are transmitted simultaneously over transmission line U2. However the different bytes are transmitted successively over this transmission line.

To read out the information stored in information store JS, switching arm *v* of distributor V successively switches gates G5 to G8 open. Previous to that it only switches gate G1 open for the address. The same is true for the reception of a message to be received in that the length indication arriving first is applied to distributor V over gate G3. Then follows the address which is received over gate G2 that is switched open by distributor V by identifier *Jd*. Finally follow, in succession, the bytes of the message containing the command, which are received in command store BS over gates G9 to G12, successively controlled to pass. The number of information or command bytes pertaining to a message can be 1 to 4.

It has already been explained that the length indication, transmitted in each case at the beginning of a message, is received in central control means ZS1, in distributor V and in a corresponding switching system. The length indication is counted in distributor V. The transmission of the individual bytes over transmission line U2 is carried out with the aid of the control criteria "reading," "writing," and "acknowledged," L, S and Q respectively. The counting off of the length indication takes place with the aid of these control criteria. If the number of transmitted bytes does not correspond to the previously given length indication, an alarm signal is produced.

With the aid of FIG. 3, distributor V shown symbolically in FIG. 2 is described in further detail. The distributor shown in FIG. 3 has a storage means (flip-flop stages S1 through S7), a reverse counter (flip-flop stages RZ0 through RZ7), a forward counter (stages VZ0 through VZ8), a comparator VG, two synchronization generators TC1 and TC2 and gate circuits 1 through 43. All of these gate circuits have a negating effect. This principle of logic circuits is known as the NOR technique. The voltage potentials appearing in the shown principle circuit are ground and positive potential.

All flip-flop stages are synchronously controlled in known manner. Common synchronization generators TC1 and TC2 supply synchronizing pulses for this on two synchronization lines common to the flip-flop stages. Each of the flip-flop stages has a rest position and an operating position. In the following the rest position is designated "position 0" and the operating position as "position 1." At each of the flip-flop stages one enabling input each corresponds to position 0 and position 1. If ground potential is connected to the enabling input of a flip-flop stage corresponding to position 0 in the time period between two synchronizing pulses, the flip-flop stage switches into position 0 if it was previously in position 1; if not, it remains in position 0. The same is true for position 1 of each of the flip-flop stages, which are thus developed in a completely symmetrical fashion. In addition each of the flip-flop stages has one output corresponding to position 0, and one each corresponding to position 1. Depending on which of its two positions a flip-flop stage is in, ground potential is connected from it to the output corresponding to the flip-flop stage in question. Further the flip-flop stages have one input each for the static resetting. These latter inputs of all flip-flop stages are connected with the outputs of gates 38 and 39.

The distributor according to FIG. 3 had seven inputs BVE1 to BVE7, over which it receives prior to the carrying out of a reading program, as well as prior to carrying out of a writing program, the length indication in question. These inputs are comparable for the writing program with the input of distributor V connected with the output of gate G3 in FIG. 2; on the other hand the mentioned seven inputs in FIG. 3 are comparable in regard to a reading program to be carried out with the input of distributor V connected with an input of gate G4 in FIG. 2. In addition the distributor shown in FIG. 3 has seven outputs BVT1 to BVT7. These outputs are comparable with the bank contacts of switching arm *v* of distributor V in FIG. 2. The fact that distributor V shown in FIG. 2 has only six bank contacts on its switching arm *v*, but seven outputs BVT1 to BVT7 are shown in FIG. 3 is of no importance whatever for the understanding of the invention, but is only due to the fact that for reasons of simplification in FIG. 2 only a single byte, instead of two, is provided for the address of the individual apparatuses in question. In addition the distributor according to FIG. 3 has some connections for circuits, shown at the lower margin of the drawing, which are for the transmission of alarm and control commands.

As long as the distributor is in rest position there is positive potential from the direction of program control means AB shown in FIG. 2 at the circuit designated by BVR in FIG. 3; thus, at the input of gate 11. As a consequence, ground potential lies at the output thereof and at the inputs of gates 38 and 39. All flip-flop stages receive over the outputs thereof positive potential for static resetting, so that they must remain in their zero position.

As soon as the distributor is engaged by program control means, at the input of gate 11 the positive potential heretofore existing is replaced by ground potential. Thereby all flip-flop stages are released.

In the distributor the length indication is offered in such a way that ground potential, instead of positive potential, is applied over one of its inputs BVE1 through BVE7. It shall be assumed that this takes place over input BVE6. After the offering of the length indication (length indication 6 indicates that six bytes are to be expected in a writing program, or to be transmitted in a reading process) the distributor is started over circuit S*t*1 in the case of reading, or S*t*2 in the case of writing. Thus gate 10 receives ground potential over one of its inputs and thus emits positive potential at its output. Accordingly gate 9 transmits ground potential over its output. Thereby synchronization generator TC1 is released. The synchronizing pulses emitted by a central synchronization generator over circuit TG, applied to synchronization generators TC1 and TC2, are forwarded by the latter to the common synchronization lines emanating therefrom, if ground potential exists at their enabling to pass input in each case. With the first synchronizing pulse emitted by synchronization generator TC1, flip-flop stage S6 is switched out of its position 0 into its position 1.

Due to the ground potential appearing instead of the positive potential at the output of flip-flop stage S6, corresponding to position 1, the ground potential heretofore existing at the output of gate 41 is exchanged for positive potential. As until then none of the flip-flop stages RZ0 through RZ7 were as yet switched into their position 1, positive potential is also still at the output of gate 40. As a consequence there now appears at the output of gate 8, and due to double negation, also at the output of gate 28, ground potential instead of positive potential. Thereby synchronization generator TC2 is prepared for the passing of further synchronizing pulses.

At this point of time in switching, there further exists at both inputs of gate 6, positive potential so that at the input of flip-flop stage RZ6, corresponding to position 1, ground potential is effective. At the next following synchronizing pulse this flip-flop stage is switched into its position 1. There appears thereby ground potential at one of the inputs of gate 43 and as a consequence at the output of gate 40, whereby, over gates 8, 29 and 28, positive potential, instead of ground potential, is again applied to the enabling to pass input of synchronization generator TC2, so that it can forward no further synchronizing pulses. The ground potential from the output of gate 40 also reaches one input of gate 6, at the output whereof there now appears positive potential again, instead of ground potential. Due to the ground potential emitted from the output of gate 40 which thus reaches one input each of all gates 1 to 7, each further transmission of a length indication from one of the flip-flop stages S1 through S7 of the storage means to one of flip-flop stages RZ0 through RZ7 of the reverse counter is stopped for the time being.

The ground potential emitted from gate 40, developed in a manner not shown as a power gate, is transmitted over circuit ST3 as a criterion to program control means A*b* which indicates that the necessary preparation of the distributor is completed.

The distributor remains in this condition until a command is given by the program control means over circuit S*t*4, through change from positive potential to ground potential, that the distributor is to be switched forward by one step. Accordingly positive potential appears at the output of gate 12. There is also positive potential at the output of gate 43. As a consequence there appears at the output of gate 13 ground potential by which the synchronization generator TC2 is prepared to pass through the next synchronizing pulse. The positive potential still effective at the output of gate 8 reaches gates 14 and 15. It follows that the reverse counter (RZ0 through RZ7) and the forward counter (VZ0 through VZ8) are prepared to carry out a counting step. Now if the next synchronizing pulse arrives, flip-flop stage RZ6 switches from position 1 to position 0 and flip-flop stage RZ5 from position 0 to position 1, as until then positive potential was at both inputs of gate 36 and as a consequence ground potential at its output by which the last mentioned two flip-flop stages were appropriately prepared.

The two flip-flop stages VZ0 through VZ1 also switch from position 0 to position 1. The reverse counter and the forward counter have each carried out one counting step.

The ground potential now connected at the output of flip-flop stage VZ1, corresponding to position 1, is emitted over circuit BVT1. As has already been stated, output BVT1 through BVT7 are provided so that thereover the transmission and receipt of code signals, transmitted in series over one and the same transmission path, from and to their individually assigned circuits, is controlled. It has already been pointed out that the last mentioned circuits correspond to the bank contacts of switching arm *v* shown in FIG. 2.

The switching command received over circuit S*t*4 from program control means AB consist only of one pulse which is shorter than an interval between two synchronizing pulses. As a result the distributor again remains in its position until the next similar command arrives from program control means AB. As soon as it arrives, the reverse counter and the forward counter each carry out one counting step. Flip-flop stages RZ4, VZ0 and VZ2 now assume position 1. Thus ground potential is now no longer at circuit BVT1, but at circuit BVT2. In this manner the reverse counter and the forward counter are each switched forward by one step by each control pulse received from program control means AB over circuit S*t*4. Thereby ground potential is connected successively to circuits BVT1 through BVT6 and, in certain circumstances, to circuit BVT7. In the present case with length indication 6 the forward counter reaches position 6 (flip-flop stage VZ6 in its position 1), if the reverse counter has already reached position 0 (flip-flop stage RZ0 is in position 1).

As soon as none of flip-flop stages RZ1 through RZ7 is any longer in position 1 and thus reverse counter has reached position 0, there appears at the output of gate 43 ground potential instead of positive potential. This reaches gate 13 whereby further control pulses which could still arrive over circuit S*t*4 as, for example, in the case of a disturbance or the like, can no longer get through to synchronization generator TC2. Thereby the forward counter is stopped.

From flip-flop stage RZ0 which is in position 1 a criterion is transmitted in the form of ground potential to comparator VG which causes it to carry out a comparison. The length indication originally received by the storage means is offered to the comparator over line group *vg*. Further information is offered to the comparator as to the present position of the forward counter. This information is taken from the outputs corresponding to position 1 of flip-flop stages VZ1 through VZ7. It is also possible to take this information from the outputs of these flip-flop stages corresponding to the two positions. If this comparison leads to a negative result that is, if the length indication now does not agree with the setting of the forward counter, an alarm signal is actuated from comparator VG over circuit AL4. However if this comparing process leads to a positive result, a signal is instead connected, in the form of ground potential, to gates 18 and 19.

Thus by using two counters the supervision of the counting processes is made possible in simple manner. As the counting process in the reverse counter terminates the counting process in the forward counter by reaching of its zero position, and as both counting processes take place synchronously, an error occurring in one of the two counting processes must be detected by comparator VG.

Moreover four further testing processes are provided in connection with each running through of the distributor. One of these testing processes is independent from the result of comparator VG. Three others of the mentioned four testing processes, however, are only initiated if comparator VG has determined an agreement between the originally received length indication and the last reached position of the forward counter. Thus four testing processes are directed at the determination of the nature of an error occurring in each case, and to its location. These four types of possible errors which lead to the formation of four different alarm signals are as follows:

1. The reverse counter counts with two values.
2. The forward counter counts with two values.
3. The forward counter does not reach its end value.
4. The reverse counter does not reach position 0.

The above stated errors are detected in the following manner: To 1.

It is assumed that due to an error that has occurred, for example contact between two wires, two flip-flop stages are in position 1 in the reverse counter. This can occur during the reception of the length indication in the reverse counter, as well as during its counting process. If a circuit error that occurred has had the above-described effect, there are always more than one of the flip-flop stages of the reverse counter in position 1. This means that at the point in time of switching when flip-flop stage RZ0 is in position 1, still another of the flip-flop stages RZ1 through RZ7 is in position 1. In this case here is positive potential at the output of gate 43, as well as at the output of flip-flop stage RZ0 corresponding to position 0. As a consequence there appears ground potential at the output of gate 16 instead of plus potential. This is transmitted as an alarm signal over circuit AL1. This alarm signal indicates that the reverse counter counts with two values. To 2.

In the case that the forward counter counts with two values as was described above in (1), that is, of flip-flop stages VZ1 through VZ7 more than one is in position 1 during a counting program, flip-flop stage VZ8 is provided for the purpose of testing. If comparator VG as described transmits ground potential instead of positive potential, to one each of the inputs of gates 18 and 19 for the purpose of identifying the positive result of the comparison process, then, due to the positively proceeding comparison process, a change from ground potential to positive potential is caused thereby at the output of gate 19. The positive potential becomes effective at one of the two inlets of gate 22. Further, another one (in the case of a functioning error, more than one) of the flip-flop stages VZ1 through VZ7 is in its position 1 and flip-flop stage VZ8 is in its position 0. There is thus positive potential at both inputs of gate 20, and as a consequence also at the output of gate 21. The positive potential also becomes effective at the other one of the two inputs of gate 22. At the output of the latter gate there appears thereby ground potential instead of positive potential, whereby synchronization generator TC2 is caused to again forward synchronizing pulses from synchronizing generator TG. Now the forward counter is switched forward out of its position reached in each case with the aid of the synchronizing pulses.

For the case that the forward counter has worked properly, that is, that always only one single flip-flop stage is in position 1, none of flip-flop stages VZ1 through VZ7 is in position 1 if flip-flop stage VZ8 is in position 1. At this point of time in switching there is thus no longer ground potential at any of the inputs of gate 30, so that now ground potential appears at its output instead of plus potential. This stops, over gates 20, 21 and 22, the passage of further synchronizing pulses over synchronization generator TC2. There further lies, at this point in time of switching, positive potential at both inputs of gate 24, as, first, flip-flop stage VZ8 is in its position 1, and secondly, gate 23 negates the output signal from gate 30. The signal emitted by comparator VG is negated by gate 19, so that now positive potential is at both inputs of gate 44. From the output of the latter a criterion in the form of ground potential is transmitted over circuit UP which indicates that the result of the test run of the distributor has proceeded positively and that therefore no error exists.

However, if an error occurs within the counting process of the forward counter, by reason of which more than one of flip-flop stages VZ1 through VZ7 is in position 1, there is still positive potential at the output of gate 30 at the point in time of switching where flip-flop stage VZ8 is already in position 1. As positive potential also exists at the output of flip-flop stage VZ8, corresponding to position 0, ground potential appears at the output of gate 17. This is transmitted as an alarm signal over circuit AL3, which indicates that the forward counter has counted with two or more values; that is, that during the counting process more than one of the flip-flop stages VZ1 to VZ7 was in position 1. To 3.

If the forward counter does not reach its end value in the process described above under (2), that is, if flip-flop stage VZ8 is not switched to position 1 after all flip-flop stages VZ1 through VZ7 have been switched from position 1 to position 0, none of flip-flop stages VZ1 through VZ8 is in position 1. Accordingly ground potential is transmitted from the output of gate 30 so that at one of the inputs of gate 26 positive potential due to the negating effect of gate 23 exists. As from the output corresponding to position 1 of flip-flop stage VZ8, positive potential exists at the other one of the two inputs of gate 26, ground potential appears at the output thereof, and as a consequence at the output of gate 27 positive potential which reaches one of the inputs of gate 42. At one of the further inputs of this gate there also exists at this point in time of switching (comparison process has proceeded positively) positive potential from the output of gate 19. At the third of the inputs of gate 42 there also exists positive potential from the output which corresponds to position 0 of flip-flop stage RZ0. As a consequence this gate emits ground potential, so that after double negation an alarm signal in the form of ground potential is transmitted over circuit AL3, which characterizes a disturbance in the forward counter.

Thus the forward counter is tested after each distribution process, which is terminated by a comparison process with the air of comparator VG regarding its full functioning ability, and also with regard to those flip-flop stages which actually remain unused in an operating process of the distributor for the processing of a length indication which is shorter in its numerical value than the maximum. To 4.

Finally there is also the possibility that due to an error in the reverse counter, this does not reach its end value. In this case flip-flop stage RZ0 is not switched from position 0 into position 1. However, in the meantime flip-flop stage VZ8 was switched from position 0 into position 1. As a consequence in this point in time switching positive potential is at both inputs of gate 18. An alarm signal then is transmitted over circuit AL2 which indicates that the reverse counter does not reach its zero position.

I claim:

1. In a circuit arrangement for telephone exchange installations wherein messages of different length are divided according to their length into a number of corresponding code signals of constant information volume for transmission in series over the same transmission path (U2) and consist of equally large groups of code elements, and wherein, prior to the code signals of a message, a length indicating signal indicative of the length of the message is transmitted to indicate the number of code signals corresponding to the message, the improvement consisting of:

first counter means (RZ7–RZ0) presettable to an initial position by the length indicating signal and a controllable switch forward in pulse manner to a first predetermined position;

second counter means VZ0—VZ8) synchronously dependent on the switching forward of the first counter means (RZ7–RZ0) and responsive thereto to be switched forward out of a second predetermined position, the second counter means having control outputs assigned to its counting positions (BVT1—BVT7) to control the transmission and reception of code signals transmitted in series over the same transmission path (U2) from and to circuits individually assigned thereto (JS1—JS4 BS1—BS4 in FIG. 2); and a comparator (VG) responsive to the first counter means (RZ7–RZ0) attaining the first predetermined position to test the position of the second counter means (VZ0—VZ8) and the received length indicating signal with regard to agreement.

2. A circuit arrangement as recited in claim 1 further comprising:

a storage means (S1—S7) to receive the length indicating signal.

3. A circuit arrangement as recited in claim 2 wherein the length indicating signal is transmitted by the storage means (S1—S7) to the first counter means (RZ7–RZ0) and the comparator (VG).